United States Patent [19]

Lasswell

[11] 4,222,219
[45] Sep. 16, 1980

[54] SPINDLE CONSTRUCTION FOR CITRUS FRUIT PICKER

[76] Inventor: Fred D. Lasswell, 1111 N. Westshore Blvd., Tampa, Fla. 33607

[21] Appl. No.: 11,225

[22] Filed: Feb. 12, 1979

[51] Int. Cl.$^3$ ............................................. A01D 46/20
[52] U.S. Cl. ................................................. 56/328 R
[58] Field of Search ............................. 56/328 R, 330

[56] References Cited

U.S. PATENT DOCUMENTS

| | | | |
|---|---|---|---|
| 3,164,942 | 1/1965 | Middlesworth | 56/328 R |
| 3,407,580 | 10/1968 | Murray | 56/328 R |
| 3,458,982 | 8/1969 | Lasswell, Jr. | 56/328 R |
| 3,701,242 | 10/1972 | Townsend | 56/328 R |
| 3,813,860 | 6/1974 | Cecchi | 56/328 R |
| 3,864,899 | 2/1975 | Lasswell | 56/328 R |

*Primary Examiner*—Jay N. Eskovitz
*Attorney, Agent, or Firm*—Kenneth T. Snow

[57] ABSTRACT

A fruit picking panel with a certain arrangement of a plurality of parallel disposed rotating spindles and a certain arrangement of a plurality of intermingled parallel disposed stationary spindles. Both the rotating and stationary spindles penetrate the branches of a fruit bearing tree. Each of the rotating spindles is equipped with a plurality of angularly disposed adjoining shank sections lying out of the axis of rotation and including one portion thereof which is covered with an elastomer that includes as an integral portion thereof a paddle-like radial extension. When the rotating spindles on the fruit picking panel are rotated, the elastomer covered angular portions of each spindle moves toward and away from adjacent rotating and stationary spindles. When the elastomer covered sections of adjacent spindles pass each other they create a scissors action so that intermediately disposed fruit is safely and effectively sheared from its tree attachment. The stationary and rotating spindles together form a panel which is easily penetrated into the outer surface of a citrus fruit tree and by reason of the plurality of angularly disposed sections of the rotating spindles penetration is accomplished without in any way damaging the fruit or the tree branches.

5 Claims, 16 Drawing Figures

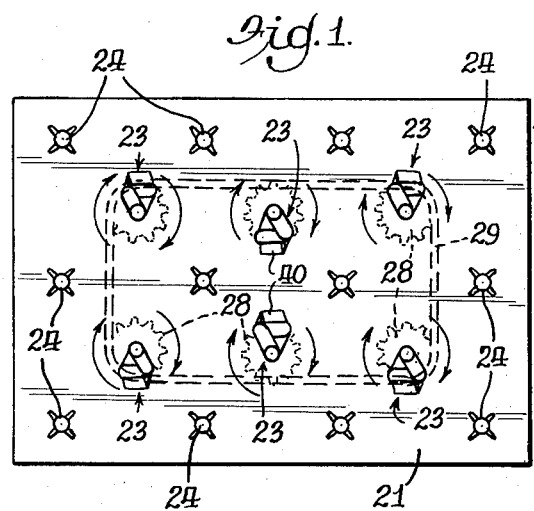
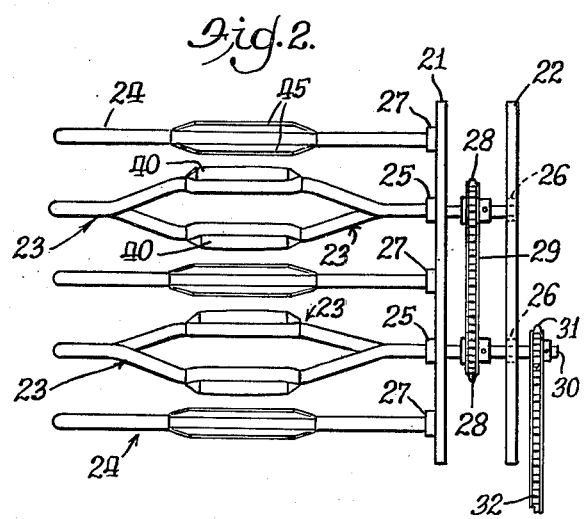
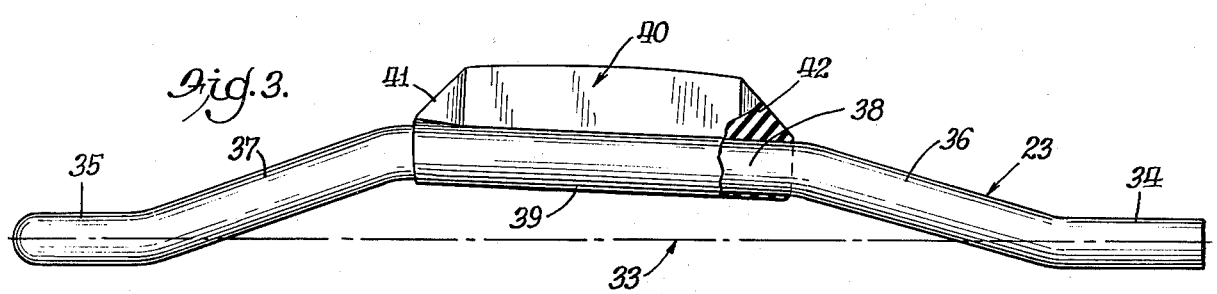
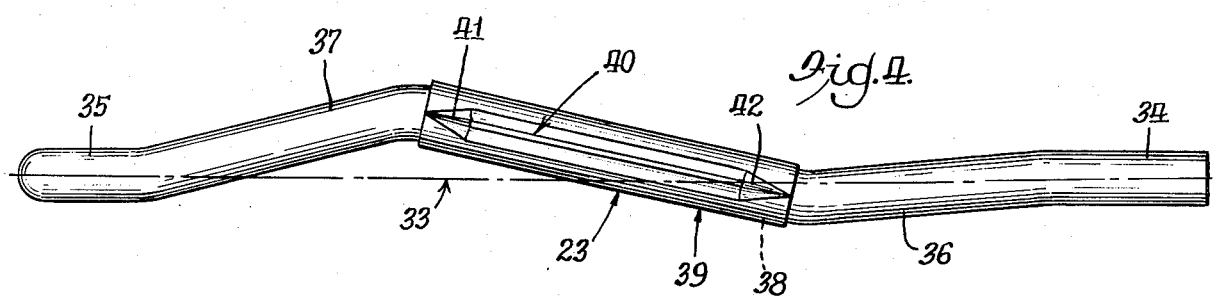
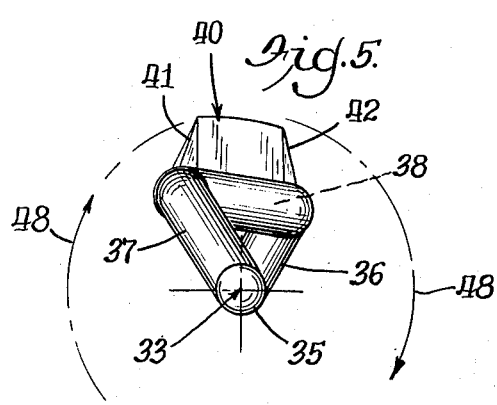
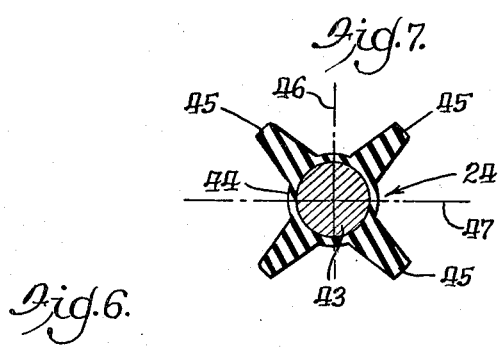
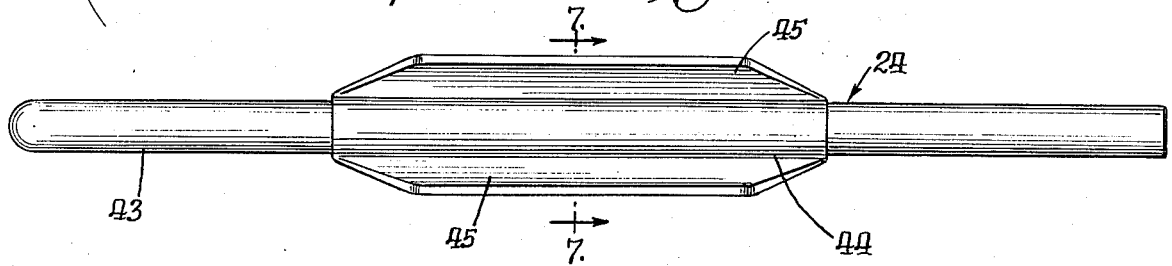

SPINDLE CONSTRUCTION FOR CITRUS FRUIT PICKER

BACKGROUND OF THE INVENTION

1. Field of the Invention

Twenty-five years has now elasped since the present inventor commenced his development of a citrus fruit harvester. Basically his machines are of the self-propelled type and include a fruit picking panel of a plurality of spindles which are adapted to be pushed into the outer surface of a fruit bearing tree at a time when at least some of the spindles are rotating thereupon causing the fruit to be disengaged by the rotation of the various spindles cooperating with each other and with certain stationary spindles employed on the fruit picking panel. This inventor has obtained numerous patents on spindle arrangements, spindle constructions, and including a variety of features utilized on his developed spindles. The object always has been to obtain maximum fruit harvesting with a minimum of damage to the fruit and a minimum of damage to the trees being harvested. Although this inventor has come close to producing a machine which is commercially acceptable no commercial picking machine is yet being used by the citrus industry. Applicant believes that the multiple angular sections of his effectively gyrating spindles so reduce the solid surface effect of his panel of spindles that the spindles can easily penetrate into and around the branches of a citrus tree without causing any damage to the fruit and without breaking any branches. The spindles are such that the angles of disposition of the various sections thereof never push directly on a branch or on the fruit hanging on the tree but rather the branches and fruit are tenderly shifted to one side as the spindles penetrate into the tree to be harvested. And, once the spindles of the panel have penetrated the tree their continued rotation causes certain sections thereof to create a scissors action such that almost all of the fruit hanging in that area is successfully removed from attachment to the branches thereupon causing the harvester of this invention to harvest substantially all of the tree's fruit. Such a result of course compares very favorably to the manual picking of citrus fruit both from the standpoint of the percentage of fruit picked, the quality of fruit picked, and the economical aspects of mechanical fruit picking versus manual fruit picking.

2. Description of the Prior Art

The inventor's first patent in this field issued June 26, 1962 as U.S. Pat. No. 3,040,507. This is a basic patent in the mechanical harvesting of citrus fruit. Since that time this inventor has had U.S. Pat. No. 3,129,551 which issued Apr. 21, 1964, U.S. Pat. No. 3,197,952 which issued Aug. 3, 1965, U.S. Pat. No. 3,222,855 which issued Dec. 14, 1965, U.S. Pat. No. 3,458,982 which issued Aug. 5, 1969, and U.S. Pat. No. 3,864,899 which issued Feb. 11, 1975. All of the patents excepting the first relate to spindles and their construction as stated above. The last of the patents issuing on Feb. 11, 1975 concerned spindles with cams thereon for engaging and disengaging the fruit as the panel spindles penetrated the fruit bearing tree. This device operated quite satisfactorily except for the fact that the spindles presented too much of a solid mass to penetrate the tree and the substantial size of the cam rotors tended to damage tree branches as the spindles penetrated into the outer surface of the tree. The present device has been designed to open up the spindles and let them easily penetrate the tree without seriously striking or causing damage to the branches or fruit that the spindles may strike in the tree entry.

Another patent which may have pertinence in regard to the present invention is U.S. Pat. No. 3,701,242 which issued to Townsend on Oct. 31, 1972. This Townsend patent shows a rotating finger-like spindle which by having a uniform offset therein can be said to be gyrating. However the Townsend gyrating spindle works in cooperation with a scoop and must be manually inserted by the operator to pick one piece of fruit at a time. Townsend does not have a plurality of angular offsets in cooperating spindles which together form and create a scissors action in the removal of fruit from their tree attachments.

SUMMARY OF THE INVENTION

This invention relates to a new and improved panel of cooperative spindles of a particular construction for harvesting citrus fruit.

A principal object of the present invention is to provide a plurality of uniformly spaced apart rotating spindles on a panel and a plurality of uniformly spaced apart stationary spindles intermingled among the rotating spindles on the panel and the spindles arranged and constructed in a novel manner to effect easy tree penetration of the panel spindles and effective harvesting of fruit from the tree following insertion of the panel of spindles into the tree.

An important object of this invention is to provide a novel construction for the rotating spindles of citrus fruit harvesters such that sections of the length thereof are angled with respect to adjacent lengthwise sections thereof to provide at least one section which is capable of cooperating with an adjacent rotating spindle to provide a scissors action upon rotation and the effective stripping of fruit from the tree.

Another and still further important object of this invention is to provide a novel elastomer covering for the scissors producing sections of the plurality of rotating spindles and the elastomer covering having a generally radially disposed paddle member following the angular direction of that section of the spindle whereby when the adjacent rotating spindles meet with each other in their rotation the elastomer paddle members are the effective scissors acting members.

Still another important object of this invention is to provide a novel spindle construction for the harvesting of citrus fruit in which portions of the spindle length gyrate on rotation and act to cooperate with adjacent rotating spindles and adjacent stationary spindles in the stripping of fruit from citrus trees following penetration of the spindles into the outer surface of the fruit bearing tree.

Another and still further important object of this invention is to provide a novel panel of rotating and stationary spindles for the harvesting of fruit from a citrus tree wherein the panel is adapted to be brought to the outer surface of a tree and the spindles inserted en masse into the three and the spindles constructed in such a manner that the spindles are easily inserted into the three without damaging the branches of the tree or the fruit on the tree by reason of the spindles rotating on insertion and having angularly disposed sections thereof which tend to shift laterally any object such as a tree branch or fruit out of its path and thereby avoid damage to the branch or fruit.

Still another important object is to provide novel rotating harvesting spindles which tend to screw into a citrus tree and thereafter cooperate with other rotating spindles and stationary spindles to capture the fruit of the tree in a scissoring action causing the fruit to be pulled back into the area of the panel supporting the spindles, causing the fruit to be separated from its tree attachment, and withdrawing the rotating spindles in an unscrewing action with a minimum loss of tree fruit.

Other and further important objects and advantages will become apparent from the disclosures in the following specification and accompanying drawings.

IN THE DRAWINGS

FIG. 1 is a front elevational view of a fruit picking panel as used in this invention.

FIG. 2 is a side elevational view of the fruit picking panel of FIG. 1. FIG. 3 is an enlarged side elevational view detail of the rotating spindles employed on the harvesting panel of FIGS. 1 and 2.

FIG. 4 is an enlarged top plan view of the rotating spindle as shown in FIG. 3.

FIG. 5 is an enlarged end elevational view of the rotating spindle as shown in FIGS. 3 and 4 and taken from the outer end thereof.

FIG. 6 is an enlarged top elevational view of one of the stationary spindles as employed on the fruit picking panel of FIGS. 1 and 2.

FIG. 7 is a sectional view taken on the line 7—7 of FIG. 6.

AS SHOWN IN THE DRAWINGS

Figure 8:
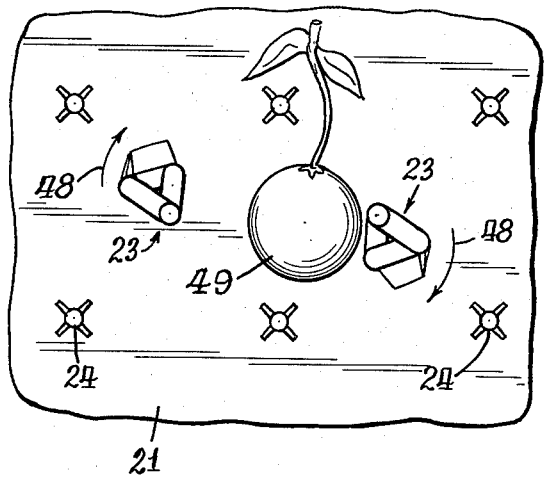
FIG. 8 is an enlarged detail view of a portion of the panel of spindles taken in such a manner as to show a citrus fruit in the area of cooperative harvesting elements of adjacent rotating spindles.

The reference numeral 20 indicates generally a panel for carrying a plurality of tree penetrating spindles for the harvesting of citrus fruit. The panel is similar to that shown in my prior U.S. Pat. Nos. 3,458,982 and 3,864,899 and its structure includes generally vertically spaced apart rectangularly shaped flat plate members 21 and 22. A plurality of uniformly spaced apart rotating spindles 23 are disposed generally parallel to each other and are journally carried at their inner ends in the spaced apart plate members 21 and 22. The rotating spindles all project outwardly in the same direction from the front side of the panel plate 21. A plurality of uniformly spaced apart stationary spindles 24 are disposed generally parallel to each other and are fixedly carried at their inner ends in the forward panel plate 21. The stationary spindles 24 are arranged in horizontal and vertical rows. Similarly the rotating spindles 23 are arranged in horizontal and vertical rows on the panel 20. The horizontal row of rotating spindles 23 are positioned midway between adjacent horizontal rows of stationary spindles 24 and the vertical rows of the rotating spindles 23 are positioned midway between adjacent vertical rows of stationary spindles 24. Thus every rotating spindle 23 is surrounded by four stationary spindles 24 which generally define the four corners of a square.

As best shown in FIG. 2 a plurality of sleeve bushings 25 are affixed in the panel plate 21. Similarly a plurality of sleeve bushings 26 are affixed in the panel plate 22. The arrangement is such that each of the bushings 26 is in axial alignment with one of the sleeve bushings 25. The aligned pairs of bushings 25 and 26 are adapted to receive and journally support the inner ends of each of the rotating spindles 23. Sockets 27 are affixed in the panel plate 21 and are adapted to fixedly receive the inner ends of the stationary spindles 24. Thus all of the spindles, panel plate 21 in the same direction. Each of the rotating spindles 23 have a sprocket 28 fixed thereto on the portion thereof positioned between the inner and outer panel plates 21 and 22. An endless chain 29 joins all of the sprockets 28. Thus, as the sprockets 28 are affixed to each of the spindle shafts, the rotation of the sprockets causes rotation of the forward harvesting portions of the spindles 23. A rearward extension 30 is provided on the inner end of one of the rotating spindles 23 as shown in FIG. 2 and carries a sprocket 31 on the back side of the rear panel plate 22. A power driven chain 32 is mounted on the sprocket 31 and is adapted to rotatably drive the sprocket 31. Thus, by reason of the chain 29 engaging all of the spindles 23 the rotational drive to one of these spindles causes all of them to be similarly rotated at a uniform speed and in the same direction.

FIGS. 3, 4 and 5 show the detailed construction of the rotating spindles 23. For convenience in understanding the construction of the spindles and their component parts there is included in the drawing, an axis line 33 which extends longitudinally of the spindle. This axis line 33 is the center line of the rotation of the spindle. The spindle 23 comprises a plurality of sections. An inner end section 34 is positioned directly on and is coincident with the axis 33. An outer end section 35 of the rotating spindle 23 is spaced substantially from the inner end section 34 but also lies on the axis of rotation 33 of the entire spindle. Thus, the inner and outer end sections 34 and 35 lie in axial alignment on the axis of rotation 33 of the rotating spindle 23. An angularly outwardly disposed section 36 has its one end adjoining the inner end section 34, and as shown in FIGS. 3, 4 and 5 this section 36 extends angularly outwardly from the axis of rotation 33 of the spindle. Another angularly outwardly disposed section 37 has its one end adjoining the outer end section 35, and as shown in FIGS. 3, 4 and 5 this section 37 extends angularly outwardly from the axis of rotation 33 of the spindle. The angle of disposition of the section 37 is different from the angle of disposition of the section 36. A final section 38 of the rotating spindle 23 bridges the space between the other ends of the sections 36 and 37 which are generally projecting toward each other. The section 38 is disposed at a compound angle relative to and spaced outwardly from the axis 33. The section 38 is the section of the rotating spindle that acts to engage the fruit on the tree and in cooperation with a corresponding section of an adjacent rotating spindle or with a section of an adjacent stationary spindle acts to sever that fruit from the tree. An elastomer sleeve 39 is molded over the section 38. An integral paddle 40 is provided on the elastomer sleeve 39 and projects radially outwardly therefrom. The paddle 40 extends substantially the length of the section 38 and is provided with a tapered forward edge 41 and a tapered rearward edge 42.

FIGS. 6 and 7 show the detailed construction of the stationary spindles 24. FIG. 6 shows a straight axial shaft 43 comprising the base for the spindle 24. An elastomer sleeve 44 is mounted on a mid-section of the straight shaft 43 in a location comparable to the location of the elastomer sleeve 39 on the section 38 of the rotating spindle 23. The elastomer sleeve 44 of the stationary spindle 24 includes stub ribs 45. There are four stub ribs disposed equally around the sleeve 44 and are located approximately 45° offset from vertical and horizontal centerlines identified by numerals 46 and 47 respectively.

In the operation of the citrus harvester of this invention it is intended that the fruit picking panel be carried by some power means to various positions around and adjacent the outer surface of a fruit bearing tree. This means for carrying the panel may be in the form of an agricultural tractor having linkage mechanisms to effect the proper movements of the harvesting panel relative to the tree to be picked. The spindle carrying panel 20 is placed adjacent the surface of the tree and moved directly thereagainst so that the spindles penetrate into and around the branches and the area of the growing fruit. The rotating and stationary spindles are adapted to easily and conveniently enter into and around the branches so that the mid-sections of the spindles are generally disposed in the area where the tree carries its fruit. The stationary spindles are sufficiently slim in their overall diameter and including their elastomer sleeves with the stub ribs 45 to permit them to move into and among the tree branches without injury or damaging those branches. The rotating spindles are moved into the tree when rotating and by reason of the sections thereof offset from the axis of spindle rotation 33 the branches and fruit are caused to be gently nudged laterally so that the spindles can move therepast without injuring any branches or fruit.

Figure 9:
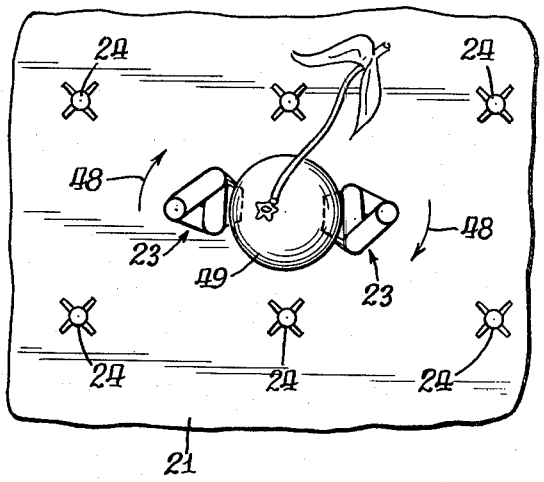
FIG. 9 is an enlarged view similar to FIG. 8 with the rotating spindles further turned and having their fruit engaging portions commencing their scissors contacting action in removing the fruit from the tree stem.
Figure 10:
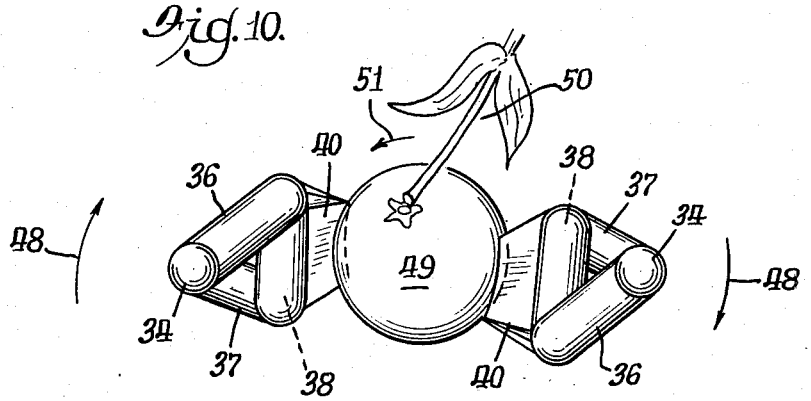
FIG. 10 is a further enlarged view of the device as shown in FIG. 9 and showing the angular engagements of long paddle harvesting members on each of the adjacent rotating spindles acting to snuggly grip the surface of the citrus fruit and by a scissors action cause its removal.

FIGS. 8, 9 and 10 depict the removal of fruit from its engagement with the tree by the cooperation of adjacent rotating spindles 23. In the drawings the direction of rotation of the rotating spindles is shown by the arrows 48. In FIG. 8 the rubber paddles 40 on the midsection 38 of the spindles are disposed at their greatest distance apart so that a fruit 49 to be picked hangs loosely between the spindles. FIG. 9 shows the same arrangement of FIG. 8 wherein there has been further rotation of the spindles 23 and the paddles are approaching their closest relationship and coming into and engaging diametrically opposite sides of the fruit 49. The action on the fruit is a scissors or twisting action between the elastomer paddles 40 of adjacent rotating spindles which are together cooperating to effect removal of the fruit 49 from its stem 50. This picking detail is perhaps shown more clearly in the enlarged view of FIG. 10. In that figure it is evident that the rotation of the spindles 23 on opposite sides of the fruit 49 will be tending to cause the intermediate fruit to be rotated or twisted in the direction of an arrow 51. Continued rotation of the spindles 23 in the direction of the arrows 48 will cause continued rotation of the intermediate fruit 49 so that the fruit is finally severed from its stem 50 and will drop free from its engagement by the cooperative rotating spindles 23 when those spindles move around and back to their positions as shown in FIG. 8.

Figure 11:
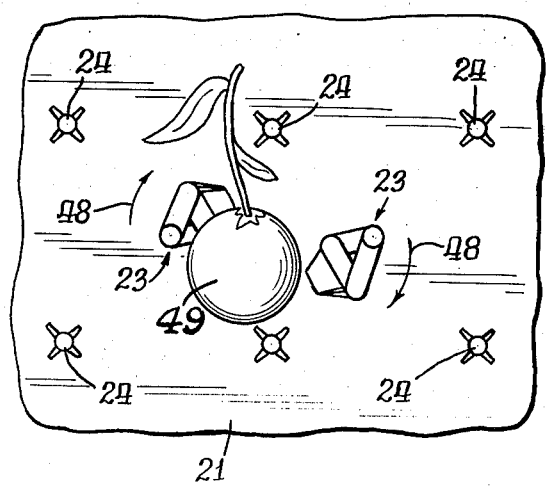
FIG. 11 is an enlarged detail view similar to FIG. 8 showing the fruit of the tree in another position within the multiple spindles of the harvesting panel.
Figure 12:
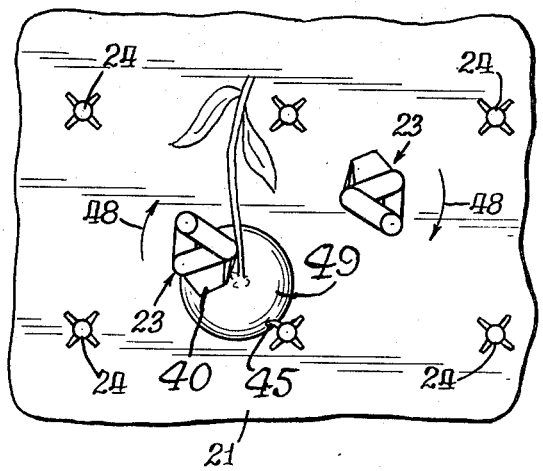
FIG. 12 is a view similar to FIG. 11 showing the rotating spindles rotated relative to their positions in FIG. 11 and causing the fruit being harvested to be engaged between the paddle of a rotating spindle and the rib of an adjacent stationary spindle to effect a twisting and thus a removal of the fruit from the tree stem.

FIGS. 11 and 12 depict the stripping of citrus fruit 49 from its holding stem 50 by reason of the cooperation of the harvesting paddle 40 of a rotating spindle 23 with one of the stub ribs 45 of a stationary spindle 24. FIG. 11 shows the fruit 49 hanging loosely between these elements and upon rotation of the spindle 23 in the direction of the arrow 48 the fruit 49 is caused to be moved downwardly against the stationary spindle 24 thereby effecting a scissors or twisting action much in the same manner as that accomplished by two adjacent rotating spindles 23.

Figure 13:
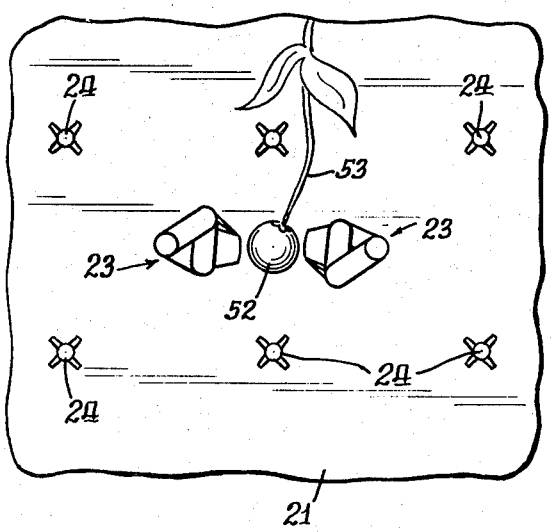
FIG. 13 is an enlarged detail view of a portion of the spindle panel with the harvesting surfaces of adjacent rotating spindles lying in their closest proximity and showing a smaller fruit loosely disposed therein.
Figure 14:
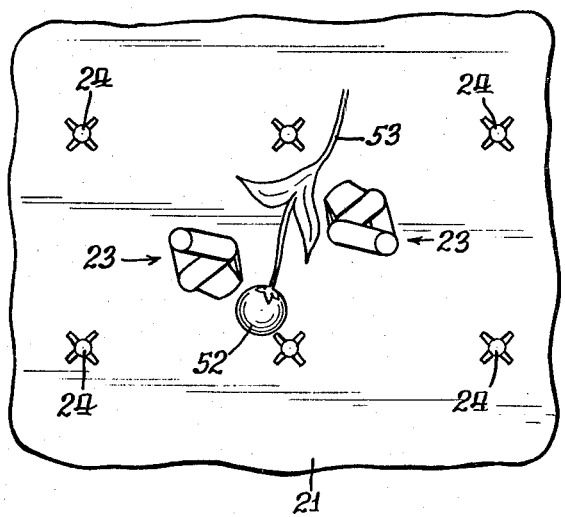
FIG. 14 is an enlarged detail view of a portion of the spindle panel with the harvesting surface of a rotating spindle and a cooperatively engaging rib of an adjacent stationary spindle in its closest proximity and showing a smaller green fruit loosely disposed therebetween.

FIGS. 13 and 14 depict the action of the panel of spindles on unripe fruit, usually of smaller diameter, such as shown at 52 hanging on a tree stem 53. In FIG. 13 the harvesting or fruit gripping paddles 40 on adjacent rotating spindles are in their closest relationship to each other and still there is no engagement with the smaller diameter fruit so that the unripe fruit is assured of being retained on the tree until it grows and is ripe and ready for picking. Similarly in FIG. 14 the fruit engaging paddles 40 of the rotating spindles are in their closest proximity to the stub ribs 45 of closely adjacent stationary spindles 24 and still the unripe fruit 52 hangs loosely therebetween.

Figure 15:
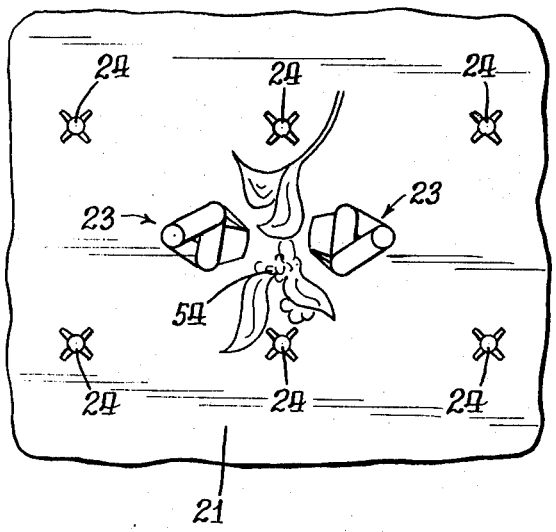
FIG. 15 is an enlarged detail view of a portion of the spindle panel with the fruit gripping surfaces of adjacent rotating spindles lying in their closest proximity and showing tree bloom loosely disposed therebetween.
Figure 16:
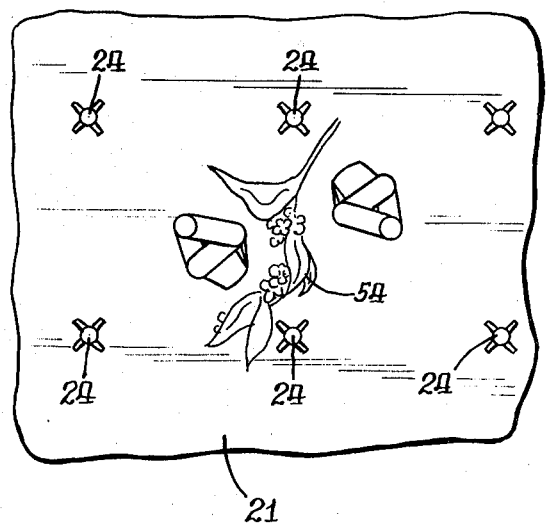
FIG. 16 is an enlarged detail view of a portion of the spindle panel with the fruit engaging surface of a rotating spindle in its closest proximity to the fruit engaging rib of an adjacent stationary spindle and showing tree bloom loosely disposed therebetween.

FIGS. 15 and 16 are similar to FIGS. 13 and 14 respectively and depict tree blossom 54 between adjacent rotating spindles and between rotating spindles and adjacent stationary spindles. Both figures show there is no engagement of the blossom 54 and thus the blossom is retained for development into fruit on that tree at a later date. There is thus no damage done to the blossom by reason of utilizing the harvesting mechanism of this invention.

The particular spindle construction wherein the rotating spindles are made of a plurality of sections, several of which are disposed angularly outwardly from the axis of rotation 33 and the stationary spindles being in a straight line and relatively slim contribute to the effective harvesting of a citrus tree's fruit without causing any damage to the fruit or the tree in the harvesting operation.

I am aware that various details of construction may be changed and it is my intention only to limit the scope of the invention by the appended claims.

What is claimed is:

1. A spindle construction for a fruit harvester comprising spaced apart inner and outer end sections in alignment on an axis of rotation, a first intermediate section joined with said inner end section at an angle out of the axis of rotation, a second intermediate section joined with said outer end section at an angle out of the axis of rotation and in a direction different from said first intermediate section and lying in a plane different from the plane of the first intermediate section, and a third intermediate section adjoining the first and second intermediate sections and disposed at a compound angle relative to and spaced outwardly from the axis of rotation, and said third intermediate section further disposed at an angular disposition different from either of the first and second intermediate sections, and the third of said intermediate sections disposed at a compound angle having means thereon for effecting fruit harvesting.

2. A device as set forth in claim 1 in which said means on the third of said intermediate sections comprises an elastomer covering having an integral, radially disposed paddle lying at the same compound angle as the third intermediate section on which it is mounted.

3. A spindle panel for fruit harvesters comprising a plurality of uniformly spaced apart rotating spindles projecting out from the panel in one direction and each having an axis of rotation, a plurality of uniformly spaced apart stationary spindles intermingled among the rotating spindles and projecting out from the panel in the same direction and each lying parallel to the axis of rotation of each of the rotating spindles, said rotating spindles comprising a plurality of sections thereof which are angularly disposed with respect to each other, and one intermediate section of the plurality of adjacent sections of each of the rotating spindles disposed at a compound angle relative to and spaced outwardly from the axis of rotation and cooperating with similar intermediate sections of adjacent rotating spindles in the panel to create a scissors action therebetween and between those intermediate sections and the stationary spindles.

4. A device as set forth in claim 3 in which the intermediate sections of the rotating spindles disposed at compound angles and creating the scissors action when cooperating with an adjacent rotating spindle having its surface thereof covered with an elastomer and further creating the scissors action when cooperating with the stationary spindles, and the elastomer having a generally radially extending paddle member disposed at the same compound angle as the intermediate section which it covers.

5. A device as set forth in claim 4 in which the stationary spindles are equipped with elastomer covers, and the elastomer covers of the stationary spindles having stub-like ribs thereon for cooperating with the scissors acting elastomer covered and paddle containing intermediate sections of the rotating spindles.

* * * * *